(12) United States Patent
Conner et al.

(10) Patent No.: US 7,542,459 B2
(45) Date of Patent: Jun. 2, 2009

(54) AD HOC NETWORK HAVING A BACK-BONE DETERMINED AT LEAST IN PART ON A METRIC AND METHOD THEREFORE

(75) Inventors: William Steven Conner, Hillsboro, OR (US); Lakshman Krishnamurthy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 854 days.

(21) Appl. No.: 10/132,947

(22) Filed: Apr. 26, 2002

(65) Prior Publication Data

US 2003/0202524 A1     Oct. 30, 2003

(51) Int. Cl.
*H04L 12/28* (2006.01)

(52) U.S. Cl. ...................................... 370/351; 370/400

(58) Field of Classification Search .................. None
See application file for complete search history.

(56) References Cited

U.S. PATENT DOCUMENTS

| | | | | |
|---|---|---|---|---|
| 5,717,687 A | * | 2/1998 | Minot et al. | 370/257 |
| 6,791,949 B1 | * | 9/2004 | Ryu et al. | 370/254 |
| 6,823,395 B1 | * | 11/2004 | Adolfsson | 709/242 |
| 6,961,573 B1 | * | 11/2005 | Moon et al. | 455/445 |
| 7,171,476 B2 | | 1/2007 | Maeda et al. | |
| 7,251,222 B2 | | 7/2007 | Chen et al. | |
| 7,392,053 B1 | | 6/2008 | Conner et al. | |
| 2002/0103893 A1 | * | 8/2002 | Frelechoux et al. | 709/223 |
| 2002/0145978 A1 | * | 10/2002 | Batsell et al. | 370/238 |
| 2003/0117966 A1 | * | 6/2003 | Chen | 370/255 |
| 2003/0137930 A1 | * | 7/2003 | Futernik | 370/216 |
| 2003/0202524 A1 | | 10/2003 | Conner et al. | |

OTHER PUBLICATIONS

B. Chen, et al. 'Span: an Energy-Efficient Coordination Algorithm for Topology Maintenance in Ad Hoc Wireless Networks,' Labratory for Computer Science, Massachusettes Institute of Technology, Cambridge, Massachusettes, pp. 85-96, Jul. 2001.
Y. Xu, et al, 'Geography-informed Energy Conservation for Ad Hoc Routing,' Information Science Intstitute, Jul. 2001.

* cited by examiner

*Primary Examiner*—Hong Cho
*Assistant Examiner*—Anthony Sol
(74) *Attorney, Agent, or Firm*—The Law Offices of John C. Scott, LLC; John C. Scott (57) ABSTRACT

Briefly, in accordance with one embodiment of the invention, an ad-hoc network comprises nodes. A sub-set of the nodes provides a backbone for communication between nodes in the ad-hoc network. At least some of the nodes in the backbone are selected to be a router based at least in part on a metric of the node.

8 Claims, 7 Drawing Sheets

AD HOC NETWORK HAVING A BACK-BONE DETERMINED AT LEAST IN PART ON A METRIC AND METHOD THEREFORE

BACKGROUND

In general, ad-hoc networks include networks where at least some of the nodes in the network may be mobile or the particular number and arrangement of nodes within the network may change with time. For example, an ad-hoc network may be formed where at least some of the nodes in the network are made up of devices such as cellular telephones, laptop computers, personal digital assistants, sensors, etc. communicating with a wireless local area network protocol (WLAN).

One drawback of ad-hoc networks is that to communicate a message to all of the nodes in the network, a flooding message is sent through every node. This may be inefficient since many nodes may receive multiple copies of the message since a particular node may be able to communicate with or receive messages from multiple neighboring nodes. In addition, ad-hoc networks involving portable devices may be difficult to maintain due to the mobility and limited battery life of the nodes in the network.

Thus, there is a continuing need for better ways to form ad-hoc networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

It should be understood that embodiments of the present invention may be used in a variety of applications. Although the present invention is not limited in this respect, embodiments of the present invention may form networks using any combination of wired or wireless nodes. Wireless nodes that may be used include, by way of example only, cellular radiotelephone communication systems, satellite communication systems, two-way radio communication systems, one-way pagers, two-way pagers, personal communication systems (PCS), personal digital assistants (PDA's), cellular radiotelephone (i.e. cell phones), sensors, and the like.

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like.

Figure 1:
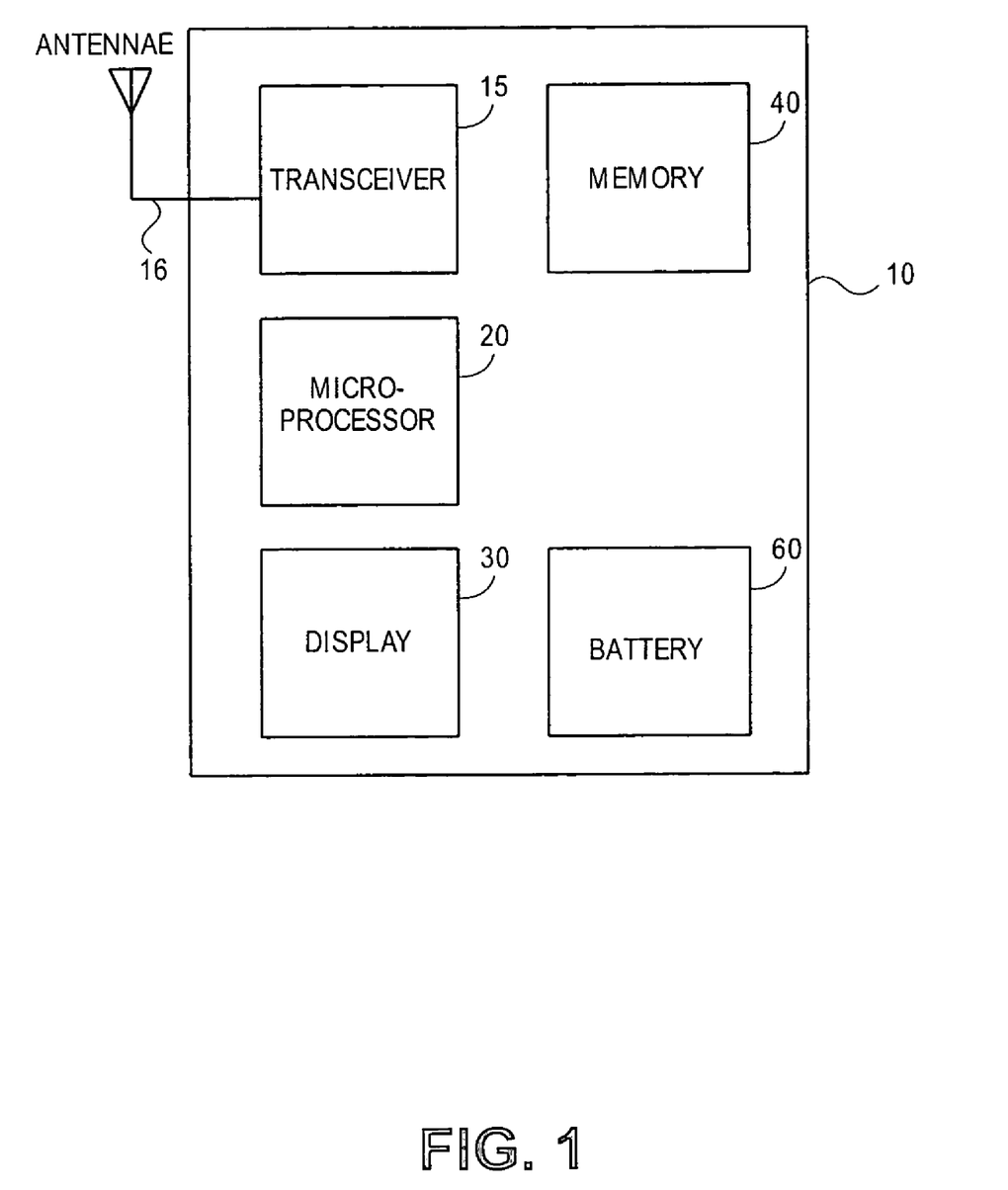
FIG. 1 is a schematic representation of a portion of a node that may be used in accordance with an embodiment.

Turning to FIG. 1, an embodiment of a node that may be used in accordance with the present invention is described. This particular embodiment may comprise a node 10 such as a mobile communication device (e.g., cell phone), a two-way radio communication system, a one-way pager, a two-way pager, a personal communication system (PCS), a portable computer, or the like. Although it should be understood that the scope and application of the present invention is in no way limited to these examples.

Node 10 may comprise, for example, a microprocessor 20, a central processing unit (CPU), a digital signal processor, a microcontroller, a reduced instruction set computer (RISC), a complex instruction set computer (CISC), or the like. Processor 20 may be used to control the operation of node 10 so that node 10 may operate as a router in a backbone of an ad-hoc network based on a router metric of the node through any combination or wired and wireless communication with other nodes.

Node 10 may also optionally include other components such as a display 30 and memory 40. Memory 40 may be used to store instructions to be executed by processor 20 and display 30 may present the results of the execution of those instructions to a user.

Memory 40 may be used to store messages transmitted to or by node 10. Memory 40 may also optionally be used to store instructions that are executed by processor 20 during the operation of node 10, and may be used to store metric data associated with node 10 that may be used, at least in part, to determine whether node 10 should be a router as part of the backbone of an ad-hoc network. Memory 40 may be provided by one or more different types of memory. For example, memory 40 may be volatile memory (any type of random access memory) or non-volatile memory, such as flash memory or any of the other memory types suggested above, although the scope of the present invention is not limited in this respect.

Node 10 may also include an Input/Output (I/O) device 10 such as, for example, a keyboard, a keypad, a mouse, etc., that may be use during the operation of node 10. In addition, node 10 may include a transceiver 15 and an antennae 16 that may be used to wirelessly communicate with other nodes in a network as explained below. For example, node 10 may receive messages from other nodes in a network or operate as a router as a portion of a backbone across an ad-hoc network.

In this particular embodiment, although the scope of the present invention is not limited in this respect, it may be desirable to form a backbone across an ad-hoc network using a subset of the nodes (e.g. multiple nodes 10) by selecting which nodes in the network are to operate or behave as routers. In such an arrangement, some nodes may act as routers that transmit messages across the network while other nodes simply send or receive messages via a nearby router. Since the network may include nodes that are made up of different types of devices, perhaps each having different operational characteristics, it may be desirable or more efficient to select which particular nodes are to operate as routers. Although the scope of the present invention is not limited in this respect, processor 20 of node 10 may be used to configure node 10 so that it is able to operate as a router.

This determination may be made, for example based on one or more operational or performance characteristics of the node; namely the router metric or metric for that node. Although the scope of the present invention is not limited in this respect, the router metric may be based, at least in part, on the remaining power level of a battery 60 associated with node 10. In addition, or alternatively, the router metric may be based on the processing capability (e.g. MIPS rate) of processor 20, the availability, capacity, or capability of memory 40, the security level of node, the transmission strength of transceiver 15, the receiving sensitivity of node 10, and the like.

Figure 2:
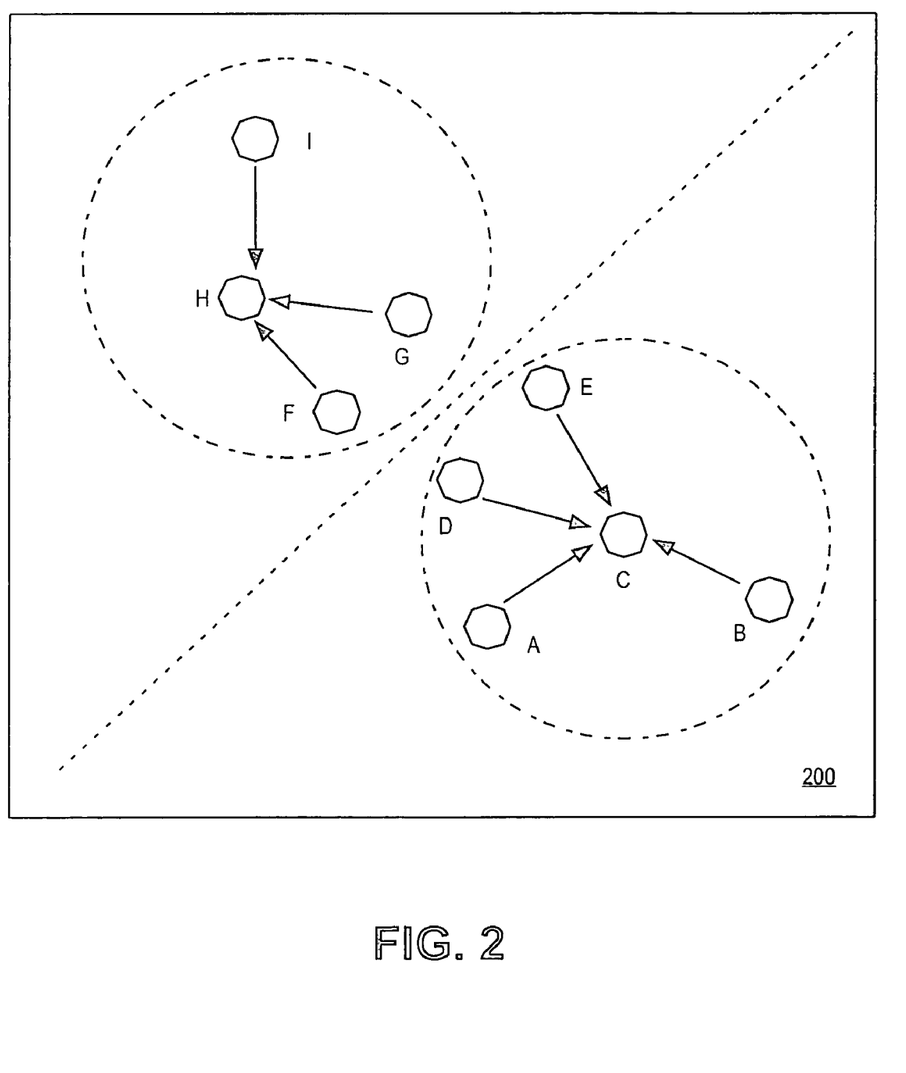
FIGS. 2 and 6 are diagrams of an ad-hoc network in accordance with an embodiment.
Figure 3:
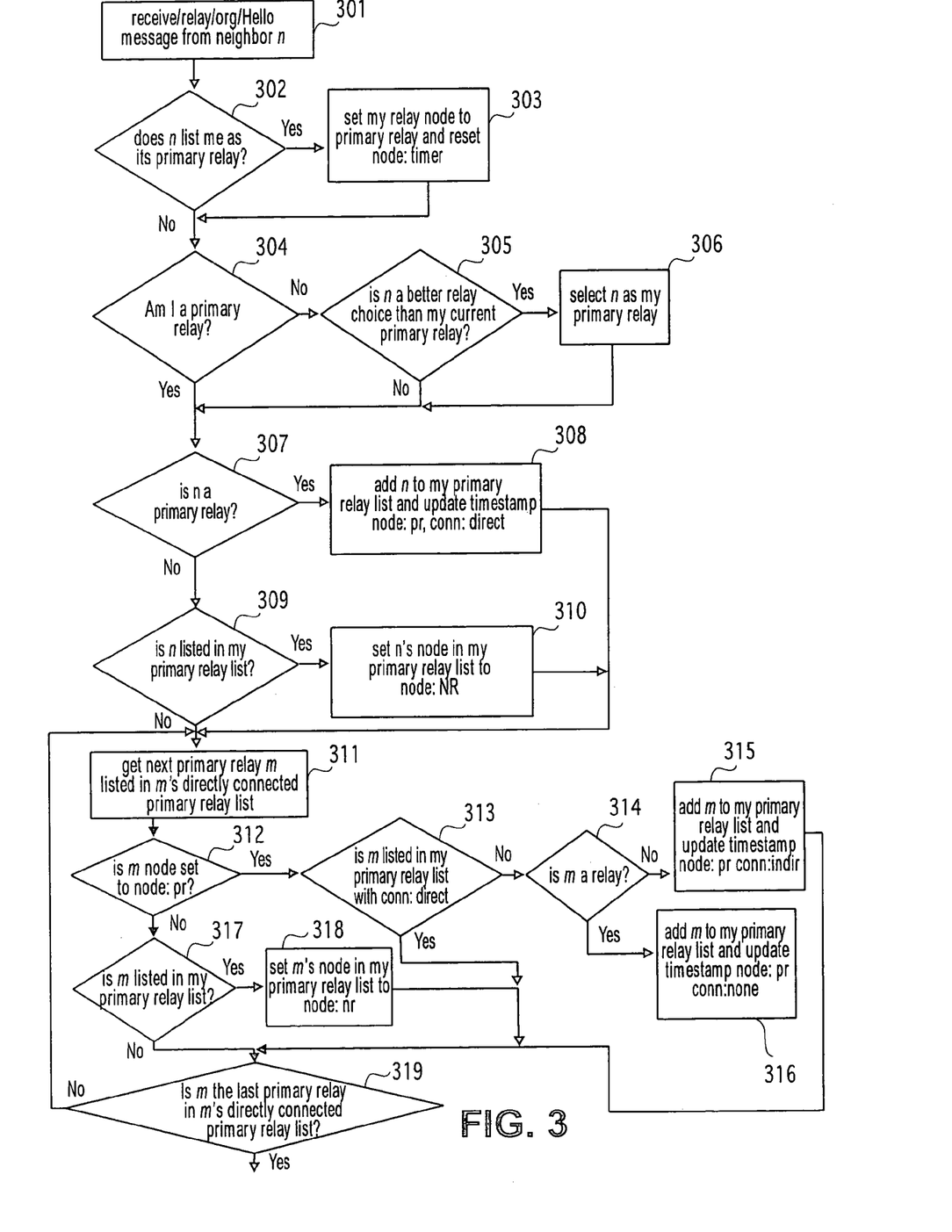
FIGS. 3-5 and 7 are flow charts to form a backbone in accordance with various embodiments.

Referring now to FIGS. 2 and 3 together, a method of forming a backbone in a network is provided. As shown in FIG. 2, nodes A-I may make up an ad-hoc network. Although the scope of the present invention is not limited in this respect, nodes A-I may be any permutation or combination of wired or wireless nodes such as node 10 described above. In addition some or all of nodes A-I may be nodes, base stations, or access points associated with cellular or WLAN networks such as nodes in a Bluetooth ™, or 802.11 network.

The method illustrated in FIG. 3 begins with nodes A-I communicating with or polling its nearest neighbors (typically designated with an 'n') so that it may learn about their router metric characteristics, box 301. The "hello" message may allow each of nodes A-I to inform the nodes with which it may communicate of its node address (e.g. any identifier), its current status (e.g. is the node a router), and its current router metrics (e.g. the current battery life of the node). In addition to learning the router metric for its neighboring nodes, nodes A-I may also receive information from its nearest neighbors that allows each node to determine if any of its neighboring nodes consider it to be that node's primary relay, box 302. (Note that when the network is first created, typically none of the nodes may be designated as being primary or secondary relay nodes, although the scope of the present invention is not limited in this respect).

If a node's neighbor considers that particular node to be a primary relay, then that node may update its status to indicate that it is a primary node, box 303. For example, one of nodes A, B, D, and E may inform node C that they consider node C to be its primary node in which case node C may update its current status to reflect that it is a primary node. This may be done for example by setting a flag or other status indicator that reflects that the node should operate as a router in network 200, although the scope of the present invention is not limited in this respect.

Nodes A-I may then determine if they themselves are a primary relay node, box 304. If they themselves are not a primary relay, they may determine if one of its current neighboring nodes would be a better primary node than its current primary node, box 305. For example, node A may currently consider node B to be its current primary node. Thereafter, if node C enters the network, or if the router metric (e.g. battery life) of node C is better than that of node B, then node A may switch its primary relay from node B to node C and inform node C of the change. Thus as indicated with arrows in FIG. 2, nodes A, B, D, and E may select node C to be its primary node, and nodes F, G, and I may select node H as their primary relay node. As a result, the nodes in network 200 may have a designated primary relay node to act as its router. However, as shown with a line in FIG. 2, node C is out of range of node H so that a backbone does not yet exist that would allow communication to every node in network 200.

Nodes A-I may then poll its neighbors to determine which of its current neighboring nodes are primary relay nodes, box 307. If one of the neighboring nodes is a primary node, then that particular node (i.e. nodes A-I) may update its primary relay node list (e.g. "Myprimaryrelay list") to reflect that its neighboring node is a primary relay node and refresh its timestamp information associated with that neighboring primary node, box 308. The timestamp information may be used later to determine how long to expect or rely on a neighboring node to be a primary node, although the scope of the present invention is not limited in this respect.

Further, if the neighboring node is not a primary relay node, but it is currently considered to be a primary relay node, box 309, the polling node may update its neighboring primary relay node list to reflect that the neighboring node is no longer a primary relay node, box 310. Although the scope of the present invention is not limited in this respect, this may occur, for example, if the battery of a primary relay node has been drained to the point where it is no longer appropriate for that node to operate as a primary relay node. Similarly, this may occur if another neighboring node has a better router metric that makes it more suitable to be a router than the current primary relay node. Note that at this point in the flowchart, nodes A-I should have an updated list of all of its neighboring nodes including those that are primary relay nodes and are those within one hop of itself.

In addition, nodes A-I may poll its neighboring nodes to determine what other nodes its neighboring nodes are able to communicate with, box 311. In other words, the nodes may poll its neighboring nodes to learn the primary relay nodes that are listed in its neighboring nodes' primary relay list. For example, nodes D and F in FIG. 2. may be able to communicate with each other, and thus, share information regarding what nodes they are able to communicate with. Continuing with this example, node F may inform node D of the existence of node H. Node D may then determine if node H is a primary node, box 312. If node H is a primary relay node, node D may then determine if node H is a primary node with which it is in direct communication (i.e. is node H listed in the primary relay node list for node D), box 313.

If the neighboring node (e.g. node F) is currently a primary relay node, box 314, then that node (e.g. node D) will update its primary relay list since node H is two-hops away (i.e. a node that is in communication with one of its neighboring nodes) and record other relevant information such as the timestamp, etc., box 315. If the neighboring node (e.g. node F) is currently not a primary relay node, then that node (e.g. node D) may update its primary relay list, but note that it is not in communication with that two-hop, primary relay, box, 316.

Continuing with the embodiment shown in FIG. 3, when a node polls its neighbors to learn that a neighbor of a neighboring node (typically designated with an 'm') is not a primary relay node, (the "no" branch from box 312), the node will check its current two-hop primary relay node list, box 317 to determine if the two-hop node was previously known as a primary relay. If that two-hop neighboring node was considered a primary node, then the node may update its two-hop primary relay node list to remove that node from its list, box 318.

For example, node D may poll node F to learn about node F's neighbors. In doing so it may learn that node H is no longer a primary relay node. This may occur, for example, if the battery life or other router metric of node H has changed over time such that node H is no longer operating as a primary relay node, although the scope of the present invention is not limited in this respect. This process is then repeated until the node has learned about and updated its information regarding its two-hop neighbors, box 319.

Returning to the example illustrated in FIG. 2, at this point in the method, nodes C and H may have been designated as primary nodes. Thus, node C may be the primary node for nodes A, B, D, and E, and node H may be the primary relay node for nodes I, G, and F. In addition, node F may have learned that node C is a primary relay, and node D may have learned that node H is a primary relay node. Nodes D and F may also learn that they are not in communication with nodes H and C, respectively.

Figure 4:
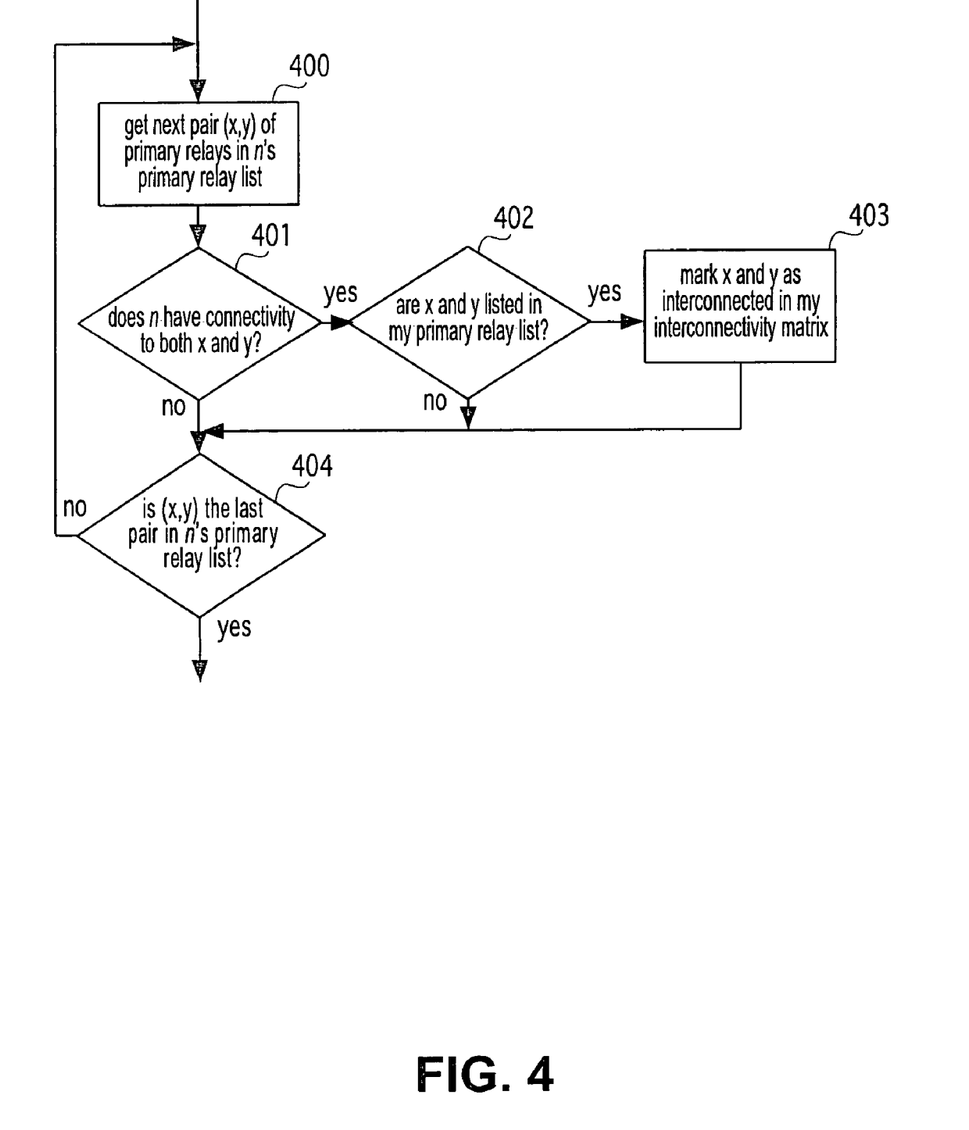

In accordance with this particular embodiment, although the scope of the present invention is not limited in this respect, nodes that are not primary relay nodes (e.g. nodes A-B, D-G, and I) in network 200 may then update their respective interconnectivity matrix as shown in FIG. 4. Although the scope of the present invention is not limited in this respect, in this particular embodiment the default condition is that a node may assume that two primary nodes are not in communication with each other (i.e. there is no interconnectivity) unless that node is able to identify another node that is either a primary relay node or a secondary router node and that is able to communicate with both nodes.

To begin, a relay node may poll it nearest neighbors to learn of all the nodes that are listed in that neighbors primary relay node list, box 400. If the neighbor is a router, the node may then go through the possible pair combinations of the primary relays that are listed in its neighbor's primary relay node list. The node (e.g. node D) may poll a neighboring node (e.g. node F) to learn that node's (e.g. node F) primary relay list. The node (e.g. node D) may then select two of the primary relay nodes (e.g. nodes C and H) that are listed in its primary relay node list. The node may then determine if that neighbor (e.g. node F) is able to communicate with those two primary nodes, box 401. For example, node D may determine if node F is in communication with both nodes C and H. If not, then the interconnectivity matrix for that node (e.g. node D) is not modified to indicate that those two primary nodes (e.g. nodes C and H) cannot be connected together by making that particular node (e.g. node F) a secondary relay node, box 404.

However, if that neighboring node is in communication with both of the primary relay nodes, box 405, then that node (e.g. node D) may determine if that pair of primary relay nodes is listed in its own primary relay list, box 402. If so, that node may update its interconnectivity matrix to indicate that the pair of primary relay nodes are able to communicate with one another, box 403. In the particular example illustrated in FIG. 2, nodes D, E, F, and G may update their interconnectivity matrix to reflect that nodes C and H are not connected. Thus, a partition may exist between these two portions of network 200 as indicated in FIG. 2 with a dashed line.

Although the scope of the present invention is not limited in this respect, at this point in the method, the nodes in network 200 may have identified which nodes may operate as a primary node and may also know which primary nodes are not in communication with each other. The gaps in network 200 (i.e. the consequence of a primary node not being able to communicate with other primary nodes) may create partitions that may be addressed by designating non-primary relay nodes as secondary relay nodes that may be part of the backbone in network 200.

Figure 5:
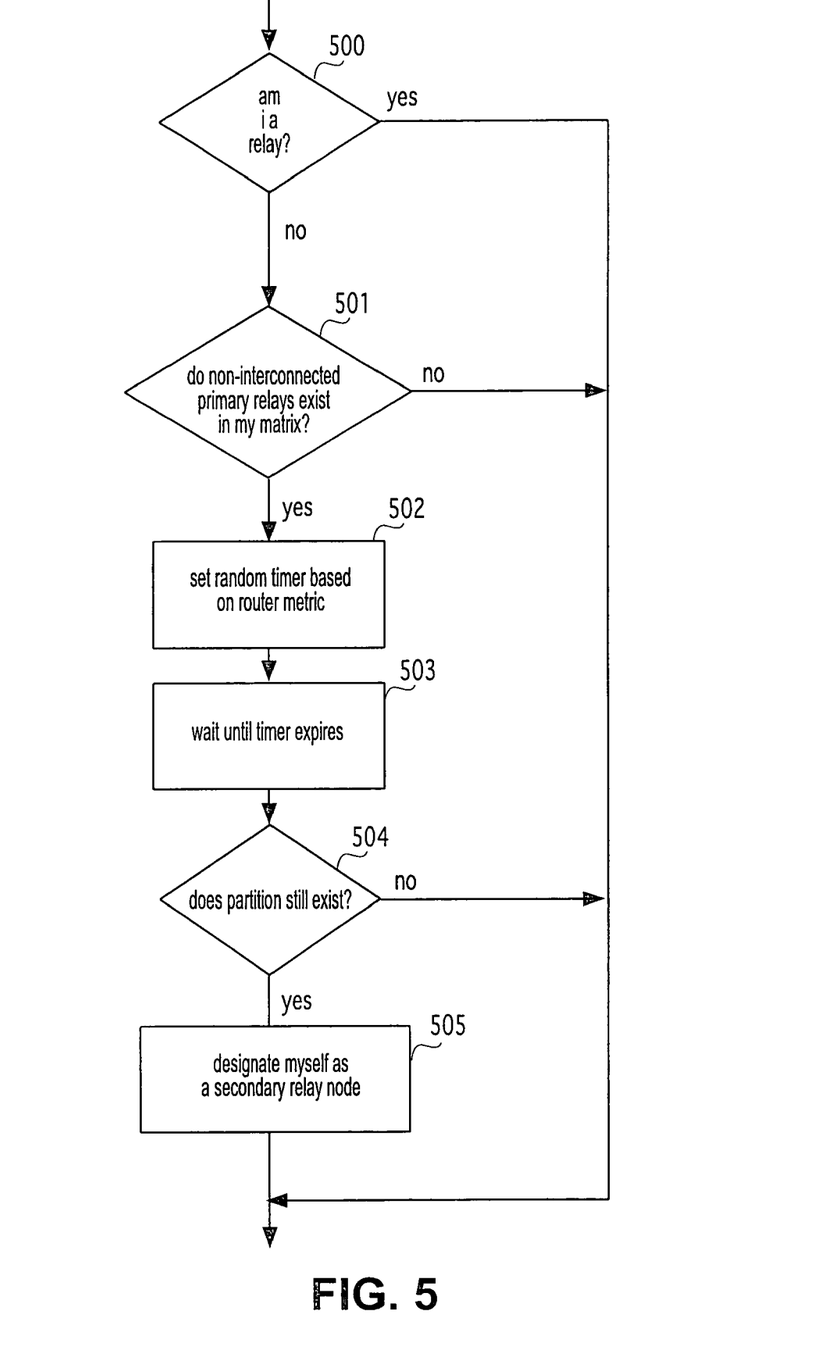

An example of an embodiment to designate secondary relays is shown in FIG. 5, although the scope of the present invention is not limited in this respect. Network 200 may periodically have all or some of the nodes (e.g. nodes A-I) review its interconnectivity records to determine if a partition exists in the network. For example, although the scope of the present invention is not limited in this respect, nodes in network 200 may send out messages to neighboring nodes periodically. Alternatively, nodes A-I may be synchronized or adapted to evaluated their interconnectivity lists with a certain frequency. The time between the checks may depend in part on factors that relate to how often a partition may exist in the network if a node happens to drop out or move or if a node can no longer operate as a primary relay node.

The nodes (e.g. nodes A-I) may determine if they are already operating as a primary or secondary relay node, box 500. If they are not, the individual nodes may evaluate their interconnectivity matrix to determine if there are any primary relay pairs that are listed as being out of communication, box 501. If a pair of primary relays is believed to be disconnected from each other (e.g. a partition exists between the two primary relays), then the node may set a random timer. The value of the timer depends, at least in part, upon the router metrics of that particular node.

For example, nodes D and E may both recognize that primary nodes C and H are not connected together. Both nodes D and E may set a timer whose value depends on one or more factors such as battery life, memory capacity, or any other router metric. The timer may also depend on whether the node is directly connected to both primary relays and whether the node can bridge more than one pair of primary relays. Although the scope of the present invention is not limited in this respect, the value of the time may be set such that is it inversely proportional to the value of the router metric for a particular node. For example, if node E has a much longer battery life, greater memory space available, greater processing capability, is directly connected to both primary routers, etc., its random timer may be set to a lower value so that its timer ends or expires faster than the random timer of other nodes that have less desirable router metric values.

After the timer for a node expires, box 503, that node may inquire to determine if the partition still exists, box 504. If the partition still exists after the timer expires, then that node (e.g. node E) may designate itself to be a secondary relay node. Thereafter, the random timer for node D may expire, but when node D checks to determine if nodes C and H are in communication with each other it will realize that it is not necessary for node D to become a secondary relay node. Similarly, nodes F and G may realize that nodes C and H are not in communication, and as a result, the node with the better router metric may designate itself a secondary node.

Figure 6:
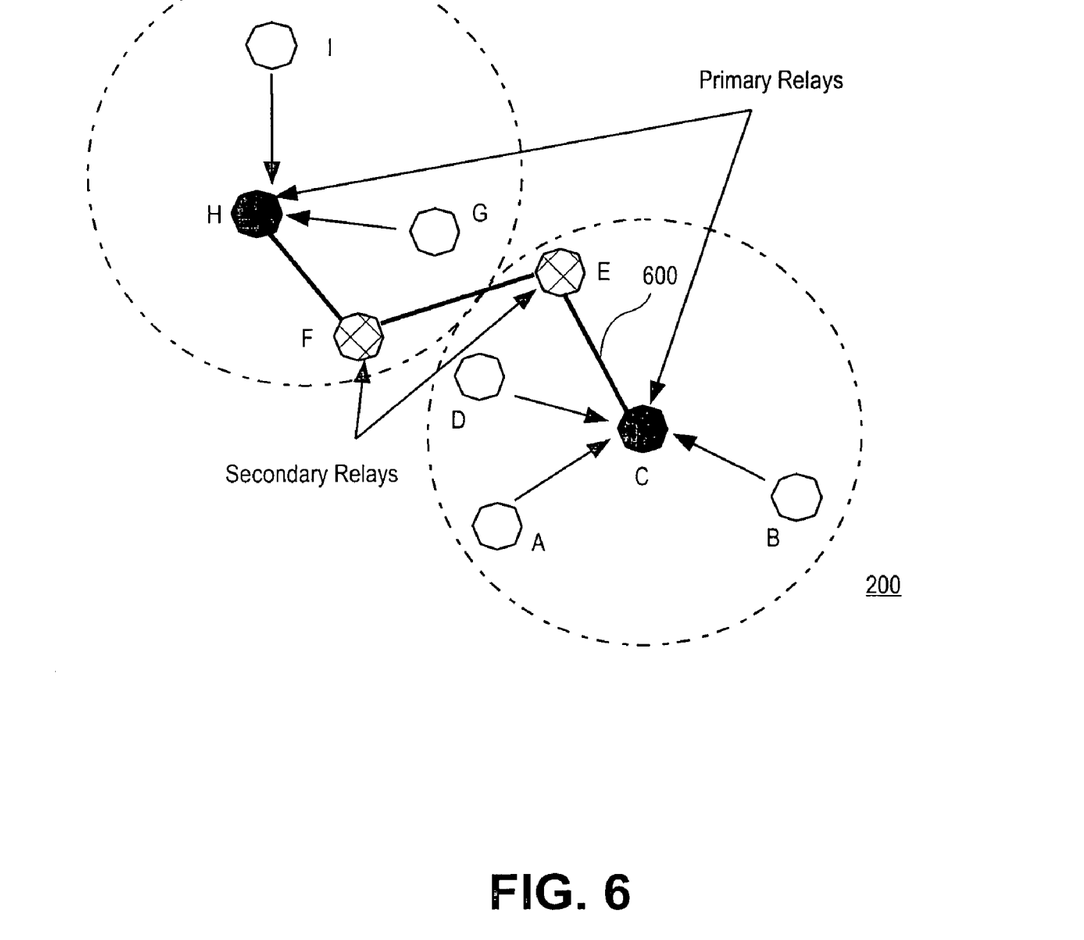

The resulting network 200 is shown in FIG. 6. As illustrated, the designation of nodes C and H as primary nodes and nodes E and F as secondary nodes creates an adaptive backbone 600 designated with a heavy line. Thus, nodes C, E, F, and H may be designated as routers that allow communication to be provided between and to all of the nodes A-I in network 200. In addition, nodes A, B, D, G, and I may not need to act as routers, and thus, they may be able to reduce their power consumption since they do not need to perform the tasks or responsibilities of being a router. In addition, the creation of backbone 600 in this particular embodiment may provide for a more efficient way to transmit broadcast messages to all or most of the nodes in network 200, because not all nodes need to transmit the message. The message may be transmitted by only those nodes acting as a router (i.e. as a primary relay node or a secondary relay node). However, it should be understood that the scope of the present invention is not limited in this respect.

In this particular embodiment, a backbone may be created across a network by designating some nodes as primary relay nodes and others as secondary relay nodes. Although the scope of the present invention is not limited in this respect, primary relay nodes may be designated by other neighboring nodes because they happen to have the strongest router metric of the neighboring nodes. Thereafter, some nodes may then designate themselves as secondary relay nodes to address any gaps or partitions in the network. After a node designates itself as a secondary relay node, the neighboring nodes may be updated to reflect the existence of another relay node.

In addition, the nodes in the network may periodically update its knowledge of its neighboring primary and secondary relay nodes so that the nodes may be able to dynamically change their operation to account for nodes being added or removed from the network. The nodes may also be able to change their operation (i.e. become a router or stop acting as a router) as their router metric(s) change over time with respect to the router metric(s) of neighboring nodes. Alternatively, nodes may need to update their knowledge of neighboring nodes, or the backbone of the ad-hoc network may need to be updated if the timestamp information for a particular node or nodes has expired. For example, a node may only be expected to be part of network 200 or expected to be a primary/secondary relay node for a period of time. Thus, the information associated with a node may be updated upon the expiration of a timestamp, although the scope of the present invention is not limited in this respect.

Figure 7:
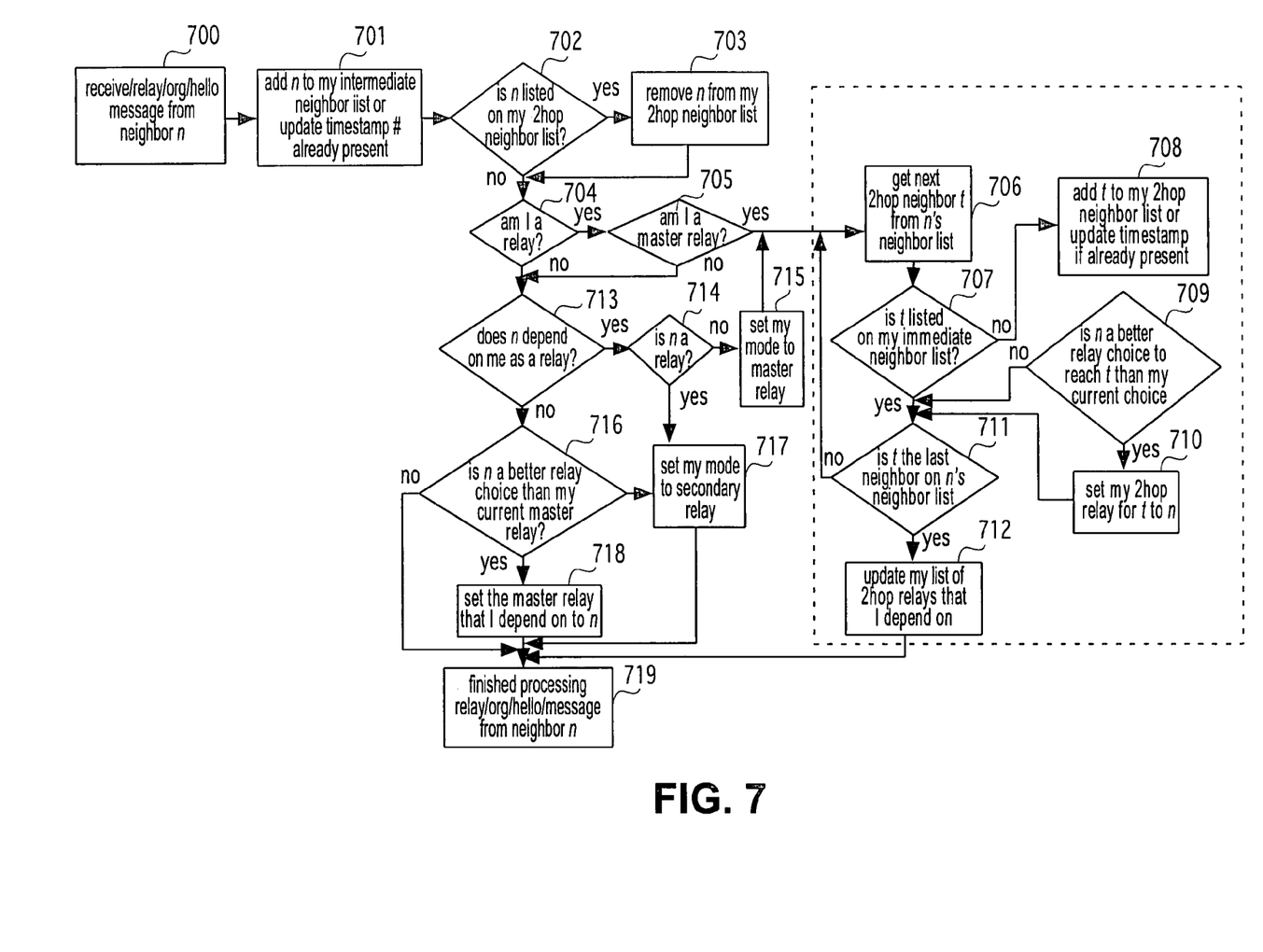

Turning to FIG. 7, an alternative method for forming a backbone in an ad-hoc network is provided. To begin, nodes A-I may receive a hello message from neighboring nodes with which they are able to communicate, box 700. Although the scope of the present invention is not limited in this respect, the message may include information such as, for example, the id number for that neighboring node, its current operational status, its router metric information, etc. The receiving node may then update its immediate neighbor list including timestamp information, etc., box 701.

The receiving node may then determine if the neighboring node had been previously listed in its two-hop neighbor list (i.e. the receiving node had previously been communicating with a neighboring node through another node), box 702. If the neighboring node was on the two-hop neighbor list, it may be removed from that list, box 703.

Nodes A-I may then check to determine if they are a relay, box 704. If a particular node is a mater relay, a primary relay, or a primary relay node (e.g. node C of FIG. 2), box 705, then that node may examine the two-hop neighbor lists to determine better ways to communicate with other nodes in the network. This process may begin by having the node poll its neighboring nodes (e.g. nodes A, B, D, and E) to review the nodes listed their own neighbor node lists. For example, node C may poll node E to learn about node F. Node C may then determine if the nodes on its neighbor's neighbor list are currently listed on its own immediate neighbor list, box 707.

If not, that node (e.g. node C) may add node F to its own two-hop neighbor list, box 708. The node may also optionally update its timestamp information associated with that node. The primary relay may then determine if that particular neighbor is a better relay choice to communicate with that particular two-hop neighbor, box 709. If so, that primary relay node may update its two-hop relay list to reflect what neighboring node is to be used to communicate with that two-hop neighbor, box 710. Once the primary relay node has polled each of neighboring nodes to review their neighboring node lists, box 711, the primary node may then update its own two-hop neighbor list to indicate which neighboring nodes it relies on to communicate with two-hop neighbors, box 712. For example, node C may update its two-hop neighbor list to indicate that it relies on node E to communicate with node F.

Returning to box 704 of FIG. 7, if a particular node is not currently a relay node, the node may determine or poll its neighboring nodes to determine if any of its neighboring nodes may rely on it to be a relay, box 713. For example, node E may poll node C to determine if node E is expected to be a relay node. That node may then determine if the neighbor that is relying on it is currently a relay node, box 714. If not, then that node may designate itself as a primary relay or a primary relay node, box 715, and go through the same process described above to update its own two-hop neighbor list (i.e. the process beginning at box 706.

If the neighboring node (e.g. node C) relying on that particular node (e.g. node E) is already a relay node, then that node (e.g. node E) may change its operation and become a secondary relay, node 717. For example, node E may learn while polling node C that node C is relying on node E for communication, and since node C is already a primary node, node E may become a secondary node.

If a neighboring node does not depend on a node to be a relay (e.g. node D does not depend on node E to be a primary or secondary relay node, then that node may determine if that neighboring node is a better relay choice than its current primary relay node, box 716. This may occur for example if a node has entered a network or if the router metric of a current primary relay has changed such that another node is better suited to be a master/primary relay, although the scope of the present invention is not limited in this respect. If a neighbor node is better suited to be a router (i.e. it has a better router metric) and it is currently not a relay, then that node may set its neighbor to be its master relay node and inform its neighbor that it is depending on it to be its master relay, box 718. This may be the end of the processing involved with processing the hello message received from each of its neighbors, box 719. Thereafter, the network may periodically repeat this process so that it may be able to account for nodes entering and leaving the network, and to account for changes in the router metrics of the nodes in the network.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method of creating a backbone in an ad hoc network, the method comprising:
    at a first node, selecting one node from a group of neighboring nodes of the first node to be a first primary relay node for the first node based, at least in part, on router metrics of the neighboring nodes of the first node, said first primary relay node being part of a network backbone;
    at a second node, selecting one node from a group of neighboring nodes of the second node to be a second primary relay node for the second node based, at least in part, on router metrics of the neighboring nodes of the second node, said second primary relay node being part of the network backbone;
    at a third node, determining whether said first primary relay node and said second primary relay node are in communication with one another and, when it is determined that said first primary relay node and said second primary relay node are not in communication with one another:
        initiating a timer with a timer value that is selected based upon a router metric of said third node;
        when said timer times out, determining whether said first primary relay node and said second primary relay node are still not in communication with one another; and
        when it is determined that said first primary relay node and said second primary relay node are still not in communication with one another, designating said third node as a secondary relay node to provide communication between said first primary relay node and said second primary relay node, said secondary relay node being part of said network backbone;
    wherein a primary relay node is a router node that provides communication between a non-router node and the network backbone and a secondary relay node is a router node that provides communication between multiple primary relay nodes.

2. The method of claim 1, wherein:
initiating a timer includes initiating said timer with a timer value that is selected based upon (a) said router metric of said third node and (b) whether or not said third node is in direct communication with both said first primary relay node and said second primary relay node.

3. The method of claim 1, wherein:
initiating a timer includes initiating said timer with a timer value that is selected based upon (a) said router metric of said third node and (b) whether or not said third node can bridge more than one pair of primary relay nodes.

4. The method of claim 1, wherein:
said router metrics include at least one of: processor capability, battery power level, memory capacity, node security level, transceiver transmission strength, and node receiving sensitivity.

5. The method of claim 1, wherein:
said network backbone carries all broadcast traffic within the ad hoc network.

6. The method of claim 1, wherein:
said first node, said second node, and said third node each select one and only one primary relay node based on routing metrics of corresponding neighboring nodes.

7. The method of claim 1, wherein:
each node in said ad hoc network selects one and only one primary relay node based on routing metrics of corresponding neighbor nodes, wherein all of said primary relay nodes are part of said network backbone.

8. The method of claim 1, wherein:
determining whether the first primary relay node and the second primary relay node are in communication with one another includes checking an interconnectivity matrix stored in said third node.

* * * * *